United States Patent [19]
Kolb

[11] Patent Number: 5,544,331
[45] Date of Patent: Aug. 6, 1996

[54] SYSTEM AND METHOD FOR GENERATING A READ-MODIFY-WRITE OPERATION

[75] Inventor: Ronald L. Kolb, Milpitas, Calif.

[73] Assignee: Silicon Graphics, Inc., Mountain View, Calif.

[21] Appl. No.: 128,720

[22] Filed: Sep. 30, 1993

[51] Int. Cl.$^6$ ................................................. H01J 13/00
[52] U.S. Cl. ......................................................... 395/308
[58] Field of Search ................................ 395/325, 500, 395/275, 306, 308, 309, 280, 482

[56] References Cited

U.S. PATENT DOCUMENTS

| | | | |
|---|---|---|---|
| 4,716,525 | 9/1987 | Gilanyi et al. | 364/DIG. 1 |
| 4,821,185 | 4/1989 | Esposito | 364/DIG. 1 |
| 4,935,894 | 6/1990 | Ternes et al. | 395/325 |
| 4,979,097 | 12/1990 | Triolo et al. | 395/325 |
| 5,072,369 | 12/1991 | Theus et al. | 395/425 |
| 5,083,259 | 1/1992 | Maresh et al. | 395/325 |
| 5,204,864 | 4/1993 | Won | 371/29.5 |
| 5,218,690 | 6/1993 | Boioli et al. | 395/325 |
| 5,315,706 | 5/1994 | Thomson et al. | 395/325 |

*Primary Examiner*—Jack B. Harvey
*Assistant Examiner*—Xuong My Chung-Trans
*Attorney, Agent, or Firm*—Sterne, Kessler, Goldstein & Fox P.L.L.C.

[57] ABSTRACT

A computer based system and method for implementing a read-modify-write operation in a computer based system comprising a first bus and a second bus, wherein the second bus is not transaction based. The method includes the steps of determining whether a first device connected to the first bus has issued on the first bus a read transaction comprising a predetermined trigger address, acquiring the second bus in accordance with the determination, reading data via the second bus from a second device connected to the second bus after the second bus has been acquired, modifying in a predetermined manner the data read from the second device, writing the modified data to the second device via the second bus, and releasing the second bus after the modified data has been written to the second device via the second bus.

17 Claims, 4 Drawing Sheets

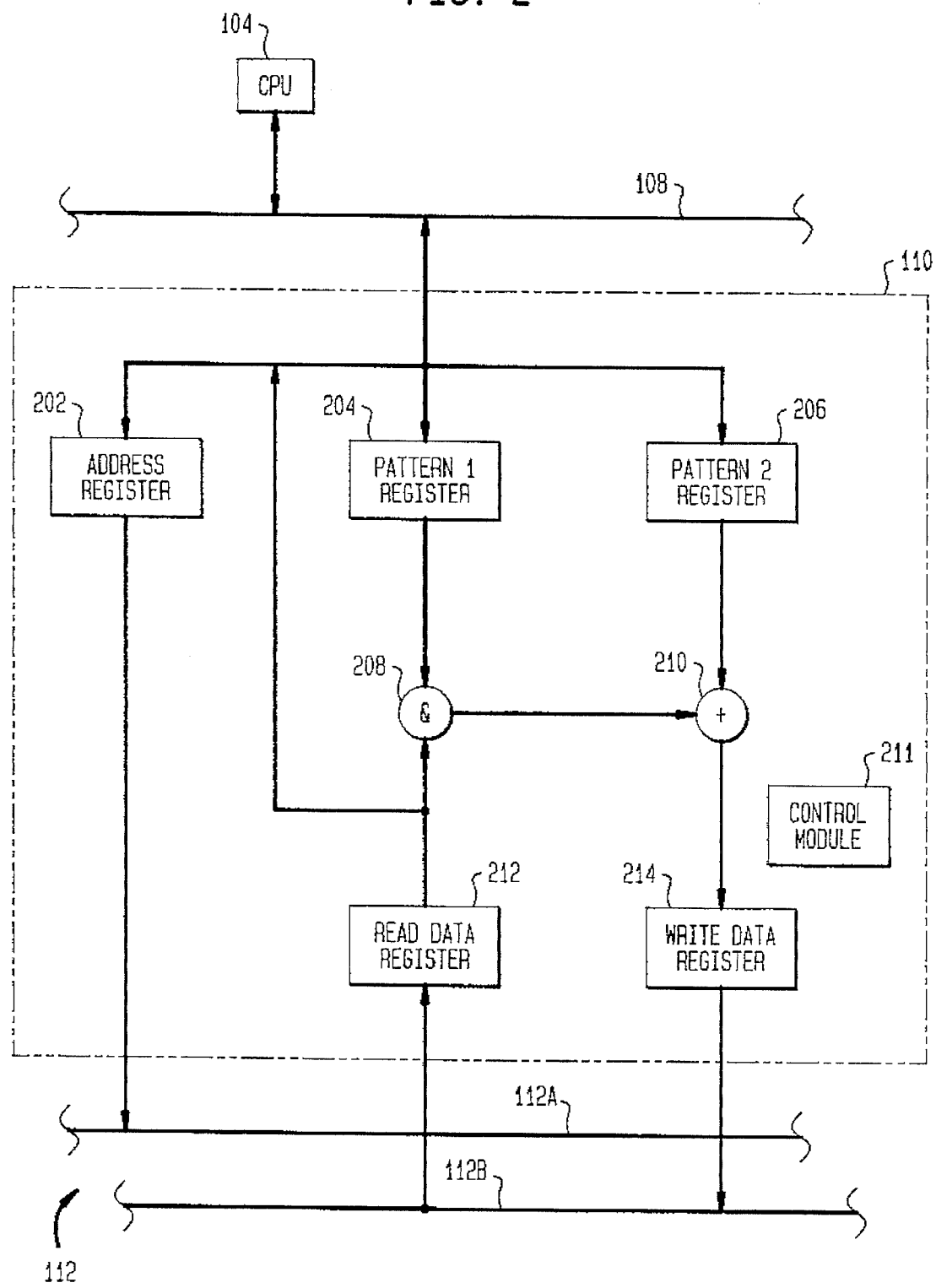

SYSTEM AND METHOD FOR GENERATING A READ-MODIFY-WRITE OPERATION

BACKGROUND OF THE INVENTION

1. Field of the Invention

The present invention relates generally to computer based systems and methods, and more particularly to computer based systems and methods for generating a read-modify-write operation.

2. Related Art

Some computer systems support a read-modify-write (R/M/W) operation. The following operations occur during the processing of a R/M/W operation in a computer system. First, a processor reads data from a memory location of a memory device over a bus. Second, the processor modifies the data in some way. Third, the processor writes the modified data to the memory location of the memory device over the bus.

The read, modify, and write operations which comprise a R/M/W operation are performed atomically. That is, the read, modify, and write operations are performed during a single memory cycle (or during one indivisible acquisition of the memory system) such that, once the R/M/W operation is initiated, it is not possible for any device (other that the processor) to access the data contained in the memory location of the memory device until after the write portion of the R/M/W operation is complete.

As will be appreciated, R/M/W operations are useful for implementing semaphores and various lock operations, such as test and set operations. The classical test and set operation involves reading data from a memory location, modifying the data, writing the modified data to the memory location, and returning the unmodified data to the requestor of the test and set operation. Given this functionality, the manner in which R/M/W operations can be used to implement test and set operations will be apparent to persons skilled in the relevant art. Test and set operations and other locking mechanisms are discussed in a number of publicly available documents, such as *Computer Architecture A Quantitative Approach* by Hennessy and Patterson (Morgan Kaufmann Publishers, 1990).

In order for a computer system to support read-modify-write operations, the computer system must normally provide an instruction wherein a read operation and a write operation are performed atomically. However, not all computer systems provide such instructions. For example, some processors developed by MIPS Computer Systems, Inc. (Sunnyvale, Cal.) do not support such instructions. In such computer systems, it has been heretofore impossible, to implement R/M/W-based locking operations.

Therefore, what is required is a system and method for implementing read-modify-write operations in computer systems which do not provide a native instruction wherein a read operation and a write operation are performed atomically.

SUMMARY OF THE INVENTION

Briefly stated, the present invention is directed to a computer based system comprising a first bus and a second bus. The second bus is non-transaction based such that when control of the second bus is granted to a second bus requestor, the second bus requestor retains control of the second bus until the second bus requestor releases its control of the second bus.

The system also includes a bus adapter which is coupled to the first bus and the second bus. The bus adapter includes first means for determining whether the bus adapter has been addressed using a predetermined trigger address by a first device connected to the first bus, and second means for acquiring the second bus. The bus adapter also includes third means for reading data via the second bus from a second device connected to the second bus, fourth means for modifying in a predetermined manner the data read from the second device, and fifth means for writing the modified data to the second device via the second bus.

The bus adapter additionally includes means for releasing the second bus after the fifth means has written the modified data to the second device via the second bus, means for acquiring the first bus after the third means has read the data from the second device via the second bus, and means for transferring the data read from the second device to the first device via the first bus.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIG. 2 is a block diagram of a bus adapter in accordance with a preferred embodiment of the present invention;

DETAILED DESCRIPTION OF THE PREFERRED EMBODIMENTS

Figure 1:
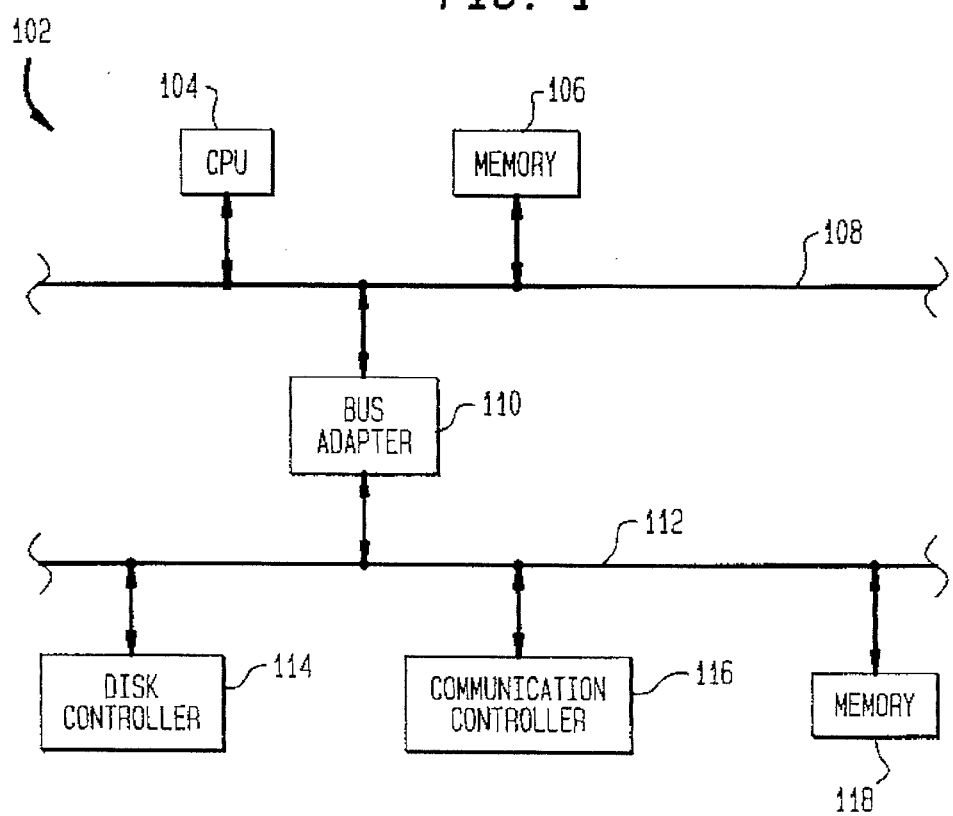
FIG. 1 is a block diagram of a computer system in accordance with a preferred embodiment of the present invention.

FIG. 1 is a high level structural block diagram of a computer system 102 in accordance with a preferred embodiment of the present invention. The computer system 102 includes a central processing unit (CPU) 104 and a memory 106 (such as a random access memory, or RAM) connected to a system, or primary bus 108. One or more input/output devices, such as a disk controller 114 and a communication controller 116, are connected to an input/output, or secondary bus 112. A memory device 118 (such as a RAM) may also be connected to the secondary bus 112.

The primary bus 108 is connected to the secondary bus 112 via a bus adapter 110, which is connected to both the primary bus 108 and the secondary bus 112. In one embodiment of the present invention, the bus adapter 110 may be connected to the primary bus 108 via a bus bridging module (not shown) which performs some preliminary electrical and/or bus protocol translations between the primary bus 108 and the secondary bus 112. The bus bridging module is not necessary to achieve the features of the present invention, and therefore shall not be described further.

Devices (such as the CPU 104) which are connected to the primary bus 108 must request the primary bus 108, and be granted use of the primary bus 108, in order to exchange data, commands, and/or other messages with other devices via the primary bus 108. The primary bus 108 is allocated to requestors of the primary bus 108 in accordance with a bus arbitration protocol. The detailed operation and implementation of the arbitration protocol used in conjunction with the primary bus 108 is beyond the scope of the present invention, although any number of well known arbitrary protocols could be used.

Thus, the specific and particular operation of the primary bus 108 is not relevant to the present invention. Preferably, however, the arbitration protocol used in conjunction with the primary bus 108 is transaction based. That is, a device is granted the primary bus 108 for the purpose of performing a single transaction. The device does not retain the bus after performing the transaction. Instead, after the device performs the transaction, the device automatically relinquishes the bus.

Also, the arbitration protocol used in conjunction with the primary bus 108 is preferably "split read" transaction based (other types of arbitration protocols could be alternatively used). Read transactions are split into two transactions: a read request transaction and a data response transaction. After successfully arbitrating for the primary bus 108, a requesting device wishing to read from a responding device issues a read request transaction on the primary bus 108. Once the read transaction is issued, the requesting device automatically loses control of the primary bus 108. The responding device requests (that is, arbitrates for) the primary bus 108 when it has data to send back to the requesting device. Once it is granted the primary bus 108, the responding device issues a data response transaction to thereby convey the data to the requesting device over the primary bus 108.

Transaction based buses and split read transaction based buses are well known. For example, some computer systems implemented in accordance with the MIPS computer architecture include split read transaction based buses.

The secondary bus 112 is similar to the primary bus 108, in that devices (such as the disk controller 114) which are connected to the secondary bus 112 must request the secondary bus 112, and be granted use of the secondary bus 112, in order to exchange data, commands, and/or other messages with other devices via the secondary bus 112. The secondary bus 112 is allocated to requestors of the secondary bus 112 in accordance with a bus arbitration protocol.

The arbitration protocol used in conjunction with the secondary bus 112 is not transaction based. Once a device is granted the secondary bus 112, the device retains control of the secondary bus 112 until the device relinquishes the secondary bus 112. For example, once a device is granted the secondary bus 112, the device may perform any number of read and/or write operations using the secondary bus 112. While one device has control of the secondary bus 112, all other devices connected to the secondary bus 112 cannot communicate over the secondary bus 112.

Non-transaction based buses are well known. For example, the commonly known Versa Module Europe (VME) bus is a non-transaction based bus.

In accordance with the present invention, devices which are connected to the primary bus 108 (such as the CPU 104) utilize the secondary bus 112 to perform read-modify-write operations. Specifically, a bus adapter 110 is provided which connects the primary bus 108 to the secondary bus 112 (alternatively, the bus adapter 110 could be directly connected to the CPU 104, such that the CPU 104 is connected to the secondary bus 112 via the bus adapter 110). The bus adapter 110 performs many well known functions, such as receiving programmed input/output (PIO) instructions from the CPU 104, transmitting the PIO instructions to the disk controller 114 and/or the communication controller 116, and transmitting data received from the disk controller 114 and/or the communication controller 116 to the CPU 104 and/or the memory device 106.

In accordance with the present invention, the bus adapter 110 also includes many structural and operational features for the purpose of using the secondary bus 112 to implement a read-modify-write operation. Such structural and operational features of the bus adapter 110 shall now be described.

FIG. 2 is a more derailed structural block diagram of those portions of the bus adapter 110 pertaining to implementing a R/M/W operation. The bus adapter 110 includes an address register 202 which is connected to the primary bus 108, and which preferably stores a memory address transferred from the CPU 104 via the primary bus 108. The bus adapter 110 also preferably includes a pattern 1 register 204 and a pattern 2 register 206, each of which is connected to the primary bus 108. The pattern 1 register 204 and the pattern 2 register 206 each preferably stores a data pattern or mask transferred from the CPU 104 via the primary bus 108.

The secondary bus 112 is shown in FIG. 2 as including an address bus 112A and a data bus 112B. The address register 202 is connected to the address bus 112A. A read data register 212 is provided which stores data that is read from a device (such as the disk controller 114 or memory device 118) connected to the secondary bus 112 via the data bus 112B. A write data register 214 is provided which stores data that is to be written to a device (such as the disk controller 114 or memory device 118) connected to the secondary bus 112 via the data bus 112B.

The bus adapter 110 also preferably includes a multi-bit AND module 208 which performs a logical AND operation on data received from the pattern 1 register 204 and the read data register 212. The AND module 208 can be implemented in any well known manner. Note that the output of the read data register 212 is also connected to the primary data bus 108.

The bus adapter 110 further preferably includes a multi-bit OR module 210 which performs a logical OR operation on data received from the pattern 2 register 206 and on data from the output of the AND module 208. The OR module 210 can be implemented in any well known manner.

A control module 211 is preferably provided for controlling the operation of the bus adapter 110 such that the bus adapter implements a read-modify-write operation. The control module 211 is preferably implemented as a hardware implemented state machine. Alternatively, the control module 211 is implemented using a processing device (such as a central processing unit) which operates in accordance with computer software.

The operation of the bus adapter 110 shall now be described with reference to FIGS. 3A and 3B, which collectively illustrate a flow chart 302 depicting the operation of the bus adapter 110. Implementation of the control module 211 such that the control module 211 causes the bus adapter 110 to operate as shown in FIGS. 3A and 3B will be apparent to persons skilled in the relevant art.

Figure 3B:
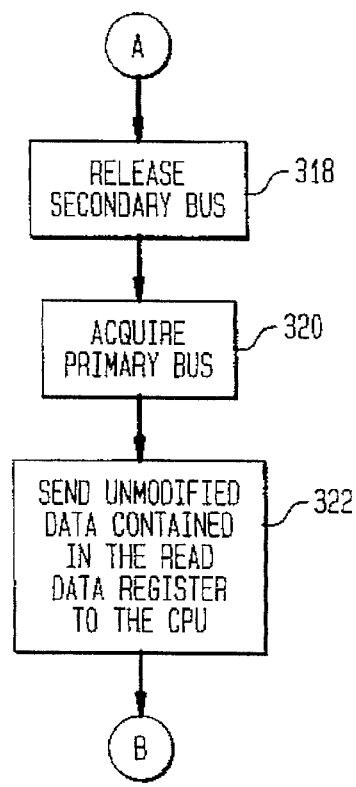
FIGS. 3A and 3B collectively illustrate a flow chart depicting the operation of the bus adapter in accordance with a preferred embodiment of the present invention.
Figure 3A:
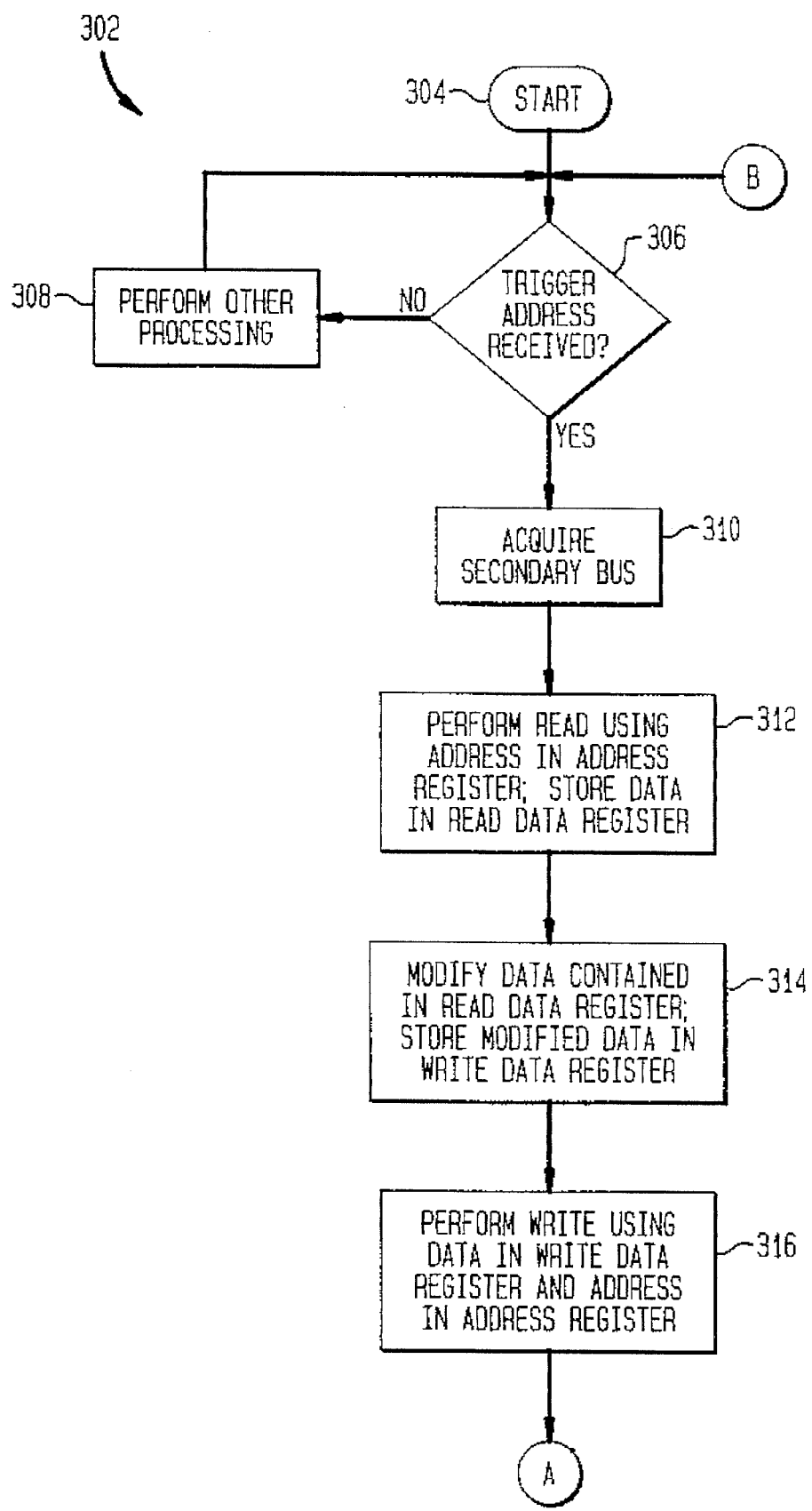

The flow chart 302 of FIGS. 3A and 3B starts at step 304, where control immediately passes to step 306.

In step 306, the bus adapter 110 determines whether a trigger address (described below) has been received over the primary bus 108. As will be appreciated, the registers of the bus adapter 110 are within the address space of the CPU 104.

That is, each of the registers of the bus adapter 110 is assigned an address relative to the primary bus 108. When the CPU 104 wishes to access one of the registers in the bus adapter 110, the CPU 104 places the address of the register on the address lines (not shown) of the primary bus 108. Preferably, the CPU 104 issues a trigger address to the bus adapter 110 by sending a read request transaction to the bus adapter 110 via the primary bus 108, wherein the read request transaction addresses the read data register 212.

In essence, when the CPU 104 issues a trigger address to the bus adapter 110 (specifically the read data register 212), the CPU 104 is commanding the bus adapter 110 to perform a read-modify-write operation. In response to receiving the trigger address from the CPU 104, the bus adapter 110 performs steps 310–322 through control module 211.

If, in step 306, the bus adapter 110 determines that a trigger address (described below) was not received, then the bus adapter 110 performs step 308. In step 308, the bus adapter 110 performs other processing, such as receiving programmed input/output (PIO) instructions from the CPU 104, transmitting the PIO instructions to the disk controller 114 and/or the communication controller 116, etc.

Also during step 308, the bus adapter 110 may receive from the CPU 104 parameters for performing a subsequent read-modify-write operation. In particular, during step 308 the bus adapter 110 may receive from the CPU 104 a memory address. The bus adapter 110 stores the memory address in the address register 202. The memory address specifies the memory location that is read during the "read" portion of the subsequent read-modify-write operation.

Also during step 308 the bus adapter 110 may receive from the CPU 104 data patterns which the bus adapter 110 stores in the pattern 1 register 204 and the pattern 2 register 206. These data patterns are used to modify the data during the "modify" portion of the subsequent read-modify-write operation. Thus, the data patterns sent to the bus adapter 110 during step 308 must be of the type (that is, the proper bit patterns) necessary to carry out the modifications desired to be performed during the "modify" portion of the subsequent R/M/W operations. Such desired modifications are implementation specific and task specific.

The CPU 104 preferably issues write transactions over the primary bus 108 to transfer the memory address and the data patterns to the bus adapter 110. These write transactions respectively target the address register 202, the pattern 1 register 204, and the pattern 2 register 206. The CPU 104 issues these write transactions before sending the trigger address (in a read request transaction) to the bus adapter 110.

If, in step 306, the bus adapter 110 determined that the trigger address was received from the CPU 104, then the bus adapter 110 performs steps 310–322.

In step 310, the bus adapter 110 acquires use of the secondary bus 112. The bus adapter 110 performs step 310 by following the predetermined protocol established by the bus arbitrator (not shown) associated with the secondary bus 112 for acquiring the secondary bus 112. Bus arbitrators and procedures for interacting with bus arbitrators to acquire buses are well known.

Once the bus adapter 110 has acquired the secondary bus 112, the bus adapter 110 uses the secondary bus 112 to perform the read-modify-write operation. This is shown in steps 312–318. Specifically, in step 312 the bus adapter 110 performs a read operation over the secondary bus 112 using the memory address stored in the address register 202. That is, the bus adapter 110 accesses a device connected to the secondary bus 112 (or, alternatively, accesses a memory location in the memory device 118) by placing the address stored in the address register 202 on the address bus 112A of the secondary bus 112. The addressed device responds by placing data on the data bus 112B. The bus adapter 110 latches this data into the read data register 212.

In step 314, the bus adapter 110 modifies the data stored in the read data register 212. Preferably, the bus adapter 110 modifies the data using the AND module 208 and the OR module 210. Specifically, the bus adapter 110 performs a logical AND operation between the data in the read data register 212 and the data pattern in the pattern 1 register 204. Then, the bus adapter 110 performs a logical OR operation between the data pattern in the pattern 2 register 206 and the data output of the AND module 208. The output of the OR module 210 is stored in the write data register 214. Note that the operation of the AND module 208 and the OR module 210 has not changed the data contained in the read data register 212.

In step 316, the bus adapter 110 uses the secondary bus 112 to perform a write operation using the data contained in the write data register 214 and the address contained in the address register 202. In other words, the bus adapter 110 writes the data contained in the write data register to the location on the secondary bus 112 addressed by the memory address stored in the address register 202.

In step 318, the bus adapter 318 releases the secondary bus 112. The procedures and mechanisms for releasing a bus are well known.

Steps 312, 314, and 316 represent a read-modify-write operation since the read operation in step 312 and the write operation in step 316 are atomically performed. That is, after the bus adapter 110 acquires the secondary bus 112 in step 310, it is not possible for any device other than the bus adapter 110 to access the memory location (or device) addressed by the memory address stored in the address register 202 until after the bus adapter 110 releases the secondary bus 112 in step 318. In other words, the read operation and the write operation are performed during a single uninterruptable acquisition of the secondary bus 112.

In steps 320 and 322, the bus adapter 110 transfers the contents of the read data register 212 to the CPU 104. In other words, during steps 320 and 322, the bus adapter 110 issues a data response transaction in response to the read request transaction (that contained the trigger address) that was previously issued by the CPU 104.

Specifically, in step 320 the bus adapter 110 acquires the primary bus 108. In step 322, after the primary bus 108 has been acquired, the bus adapter 110 sends the data contained in the read data register 212 to the CPU 104 via the primary bus 108 in a data response transaction.

After performing step 322, the bus adapter 110 loops back to step 306. Note that the bus adapter 110 automatically relinquished the primary bus 108 after issuing the data response transaction.

Figure 4:
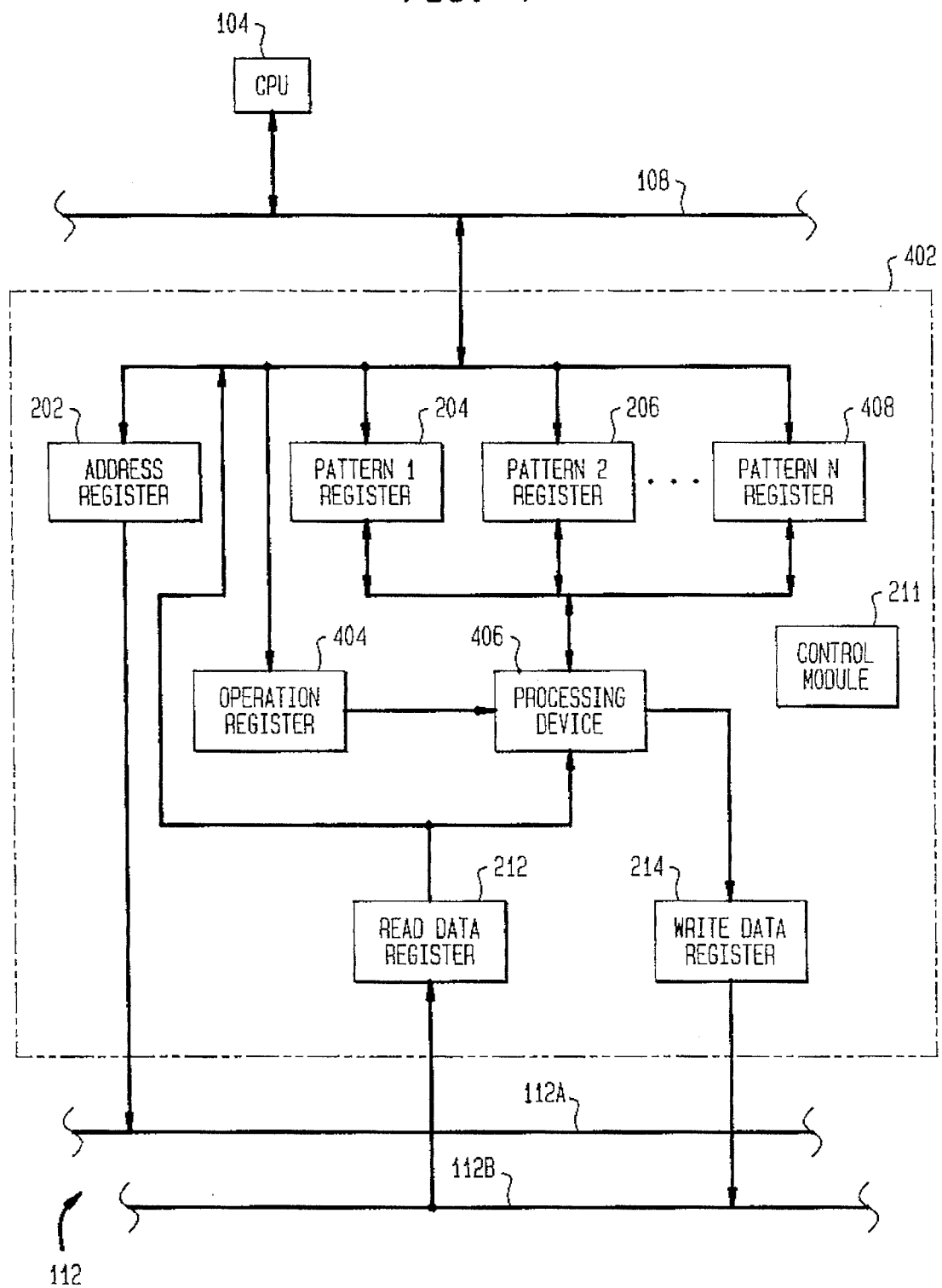
FIG. 4 is a block diagram of a bus adapter in accordance with an alternate embodiment of the present invention.

FIG. 4 is a structural block diagram of the bus adapter 402 in accordance with an alternate embodiment of the present invention. As discussed above with regard to the embodiment of the invention shown in FIG. 2, the data contained in the read data register 212 is modified by operation of a logical AND operation (performed by the AND module 208) followed by a logical OR operation (performed by the OR module 210).

In the alternate embodiment of the present invention shown in FIG. 4, the data contained in the read data register 212 may be modified using any combination of logical and/or arithmetic operations. Such logical and/or arithmetic operations are performed using a processing device 406, which may be an arithmetic logic unit (ALU), for example.

The combination of logical and/or arithmetic operations to be performed on the data in the read data register 212 are specified by an operation code, which is transferred from the CPU 104 via the primary bus 108 (during step 308 of FIG. 3A) and stored in an operation register 404. Additional pattern registers may be provided (indicated by pattern N register 408) to store additional data patterns, and/or to store intermediate processing results.

As discussed above, the CPU 104 directly transmits the memory address, the trigger address, and the data patterns to the bus adapter 110 via the primary bus 108. In an alternate embodiment of the present invention, the CPU 104 calls an operating system routine (or other low level routine) to initiate a read-modify-write operation. The CPU 104 preferably passes the memory address and the data patterns with the call to the operating system routine.

The operating system routine transmits the memory address and the data patterns to the bus adapter 110 via the primary bus 108 in the manner described above. The operating system routine then initiates the read-modify-write routine by transmitting a read request transaction (containing the trigger address) to the bus adapter 110 via the primary bus 108 in the manner described above. The bus adapter 110 then performs the read-modify-write operation as discussed above.

Use of an operating system to interact with the bus adapter 110 is advantageous in multiple processor environments where multiple processors may be attempting to simultaneously access the bus adapter 110. The operating system routine preferably operates (in a well-known manner) to ensure that only one processor (or task) has access to those registers in the bus adapter 110 associated with implementing the read-modify-write operation.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer based system, comprising:

a first bus;

a second bus, said second bus being non-transaction based wherein when control of said second bus is granted to a second bus requestor, said second bus requestor retains control of said second bus until said second bus requestor releases said second bus; and a bus adapter coupled to said first bus and said second bus, said bus adapter comprising:

first means for determining that said bus adapter has been addressed by a first device connected to said first bus upon receipt of a predetermined trigger address;

second means, coupled to and responsive to said first means, for acquiring said second bus in accordance with said determination of said first means;

third means, coupled to and responsive to said second means, for reading data via said second bus from a second device connected to said second bus once said second bus has been acquired;

fourth means, coupled to and responsive to said third means, for modifying in a predetermined manner said data read from said second device; and fifth means, coupled to and responsive to said fourth means, for writing said modified data to said second device via said second bus.

2. The system of claim 1, wherein said bus adapter further comprises means for releasing said second bus after said fifth means has written said modified data to said second device via said second bus.

3. The system of claim 1, wherein said bus adapter further comprises:

means for acquiring said first bus after said third means has read said data from said second device via said second bus; and means, coupled to and responsive to said acquiring means, for transferring said data read from said second device to said first device via said first bus once said first bus has been acquired.

4. The system of claim 1, wherein said bus adapter further comprises an address register coupled to said first bus and said second bus, said address register storing a memory address transferred from said first device to said bus adapter via said first bus, wherein said third means and said fifth means access said second device via said second bus using said memory address stored in said address register.

5. The system of claim 1, wherein said bus adapter further comprises:

a read data register coupled to said first bus and said second bus; and means, coupled to said read data register and said third means, for storing said data read from said second device by said third means in said read data register.

6. The system of claim 1, wherein said bus adapter further comprises:

a write data register coupled to said fourth means, said fifth means and said second bus; and means for storing said data modified by said fourth means in said write data register;

wherein said fifth means writes said modified data stored in said write data register to said second device via said second bus.

7. The system of claim 1, wherein said fourth means comprises:

a first pattern register, coupled to said first bus, for storing first pattern data transferred from said first device to said bus adapter via said first bus;

a second pattern register, coupled to said first bus, for storing second pattern data transferred from said first device to said bus adapter via said first bus;

an AND module, coupled to said third means and said first pattern register, for performing a logical AND operation using said data read from said second device and said first pattern data stored in said first pattern register to produce an AND module output; and an OR module, coupled to said AND module and said second pattern register, for performing a logical OR operation using said AND module output and said second pattern data stored in said second pattern register to produce an OR module output;

wherein said fifth means is coupled to said OR module and writes said OR module output to said second device via said second bus.

8. The system of claim 1, wherein said fourth means comprises:

a plurality of pattern registers, coupled to said first bus, each of said pattern registers storing pattern data transferred from said first device to said bus adapter via said first bus;

a operation register, coupled to said first bus, for storing an operation code transferred from said first device to said bus adapter via said first bus; and an arithmetic logic unit, coupled to said pattern registers, said operation register and said third means, for modifying said data read from said second device using said pattern data stored in said pattern registers in accordance with said operation code stored in said operation register.

9. A bus adapter for use in a computer based system comprising a first bus and a second bus, the second bus being non-transaction based wherein when control of the second bus is granted to a second bus requestor, the second bus requestor retains control of the second bus until the second bus requestor releases the second bus, said bus adapter comprising:

first means for determining that said bus adapter has been addressed by a first device connected to said first bus upon receipt of a predetermined trigger address;

second means, coupled to and responsive to said first means, for acquiring the second bus in accordance with said determination of said first means;

third means, coupled to and responsive to said second means, for reading data via the second bus from a second device connected to the second bus once the second bus has been acquired;

fourth means, coupled to and responsive to said third means, for modifying in a predetermined manner said data read from said second device; and fifth means, coupled to and responsive to said fifth means, for writing said modified data to said second device via the second bus.

10. The bus adapter of claim 9, further comprising means for releasing the second bus after said fifth means has written said modified data to said second device via the second bus.

11. The bus adapter of claim 9, further comprising:

means for acquiring the first bus after said third means has read said data from said second device via the second bus; and means, coupled to and responsive to said acquiring means, for transferring said data read from said second device to said first device via the first bus once the first bus has been acquired.

12. A method of implementing a read-modify-write operation in a computer based system comprising a first bus and a second bus, the second bus being non-transaction based wherein when control of the second bus is granted to a second bus requestor, the second bus requestor retains control of the second bus until the second bus requestor releases the second bus, said method comprising the steps of:

(a) determining that a first device connected to the first bus has issued on the first bus a read transaction comprising a predetermined trigger address;

(b) acquiring the second bus in accordance with said determination;

(c) reading data via the second bus from a second device connected to the second bus after the second bus has been acquired;

(d) modifying in a predetermined manner said data read from said second device;

(e) writing said modified data to said second device via the second bus; and (f) releasing the second bus after said modified data has been written to said second device via the second bus.

13. The method of claim 12, further comprising the steps of:

acquiring the first bus after said data has been read from said second device via the second bus; and transferring said data read from said second device to said first device via the first bus.

14. The method of claim 12, further comprising the step of receiving a memory address from said first device via the first bus, wherein step (c) comprises the step of using said memory address to access and read data from the second device via the second bus, and wherein step (e) comprises the step of using said memory address to access and write said modified data to said second device via the second bus.

15. The method of claim 12, wherein step (d) comprises the steps of:

receiving first pattern data and second pattern data from said first device via the first bus;

performing a logical AND operation using said data read from said second device and said first pattern data to produce an AND data output; and performing a logical OR operation using said AND data output and said second pattern data to produce an OR data output;

wherein step (e) comprises the step of writing said OR data output to said second device via the second bus.

16. The method of claim 12, wherein step (d) comprises the steps of:

receiving pattern data and an operation code transferred from said first device via said first bus; and operating an arithmetic logic unit in accordance with said operation code to thereby modify said data read from said second device using said pattern data.

17. A computer based system, comprising:

a bus, said bus being non-transaction based wherein when control of said bus is granted to a bus requestor, said bus requestor retains control of said bus until said bus requestor releases said bus; and a bus adapter coupled to said bus and to a first device, said bus adapter comprising:

first means for determining that said bus adapter has been addressed by a first device connected to said first bus upon receipt of a predetermined trigger address;

second means, coupled to and responsive to said first means, for acquiring said bus in accordance with said determination of said first means;

third means, coupled to and responsive to said second means, for reading data via said bus from a second device connected to said bus once said bus has been acquired;

fourth means, coupled to and responsive to said third means, for modifying in a predetermined manner said data read from said second device; and fifth means, coupled to and responsive to said fourth means, for writing said modified data to said second device via said bus.

* * * * *